(12) United States Patent
Weber et al.

(10) Patent No.: US 8,707,935 B2
(45) Date of Patent: Apr. 29, 2014

(54) EXHAUST GAS RECIRCULATION SYSTEM WITH A $NO_x$ SENSOR

(75) Inventors: Dave Charles Weber, Toledo, OH (US); Michiel J. Van Nieuwstadt, Ann Arbor, MI (US); Daniel Joseph Styles, Canton, MI (US); Daniel Joseph Rinkevich, Commerce, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1218 days.

(21) Appl. No.: 12/607,561

(22) Filed: Oct. 28, 2009

(65) Prior Publication Data

US 2011/0094482 A1    Apr. 28, 2011

(51) Int. Cl.
*F02M 25/06* (2006.01)
*F01N 3/10* (2006.01)
*F01N 3/00* (2006.01)
*F02B 47/08* (2006.01)

(52) U.S. Cl.
USPC ............ 123/568.12; 123/568.11; 123/568.15; 123/568.16; 123/568.22; 60/278; 60/299; 60/300; 60/301; 60/285; 60/295

(58) Field of Classification Search
USPC ............. 123/568.11, 568.12, 568.14, 568.15, 123/568.16, 568.17, 568.22, 320, 323, 688, 123/673, 703; 60/278, 299, 300, 301, 285, 60/295, 605.2, 279; 701/101, 102, 108, 701/109
See application file for complete search history.

(56) References Cited

U.S. PATENT DOCUMENTS

| | | | | |
|---|---|---|---|---|
| 5,243,852 A | * | 9/1993 | Morita | 73/114.74 |
| 5,375,416 A | * | 12/1994 | Iwata et al. | 60/276 |
| 5,396,765 A | * | 3/1995 | Maruyama et al. | 60/276 |
| 5,396,766 A | * | 3/1995 | Sato et al. | 60/276 |
| 5,461,569 A | * | 10/1995 | Hara et al. | 701/101 |
| 5,771,868 A | * | 6/1998 | Khair | 123/568.12 |
| 6,000,385 A | * | 12/1999 | Fukuma | 123/704 |
| 6,205,785 B1 | * | 3/2001 | Coleman | 60/605.2 |
| 6,311,480 B1 | * | 11/2001 | Suzuki et al. | 60/276 |
| 6,321,157 B1 | * | 11/2001 | Sun et al. | 701/103 |
| 6,360,732 B1 | * | 3/2002 | Bailey et al. | 123/568.12 |
| 6,363,317 B1 | * | 3/2002 | Druzhinina et al. | 701/104 |
| 6,390,055 B1 | * | 5/2002 | Sivashankar et al. | 123/295 |
| 7,013,879 B2 | * | 3/2006 | Brookshire et al. | 123/568.12 |
| 8,108,129 B2 | * | 1/2012 | Nakayama et al. | 701/108 |
| 2003/0114978 A1 | * | 6/2003 | Rimnac et al. | 701/108 |
| 2003/0127077 A1 | * | 7/2003 | Sisken | 123/568.11 |

(Continued)

FOREIGN PATENT DOCUMENTS

| | | | | | |
|---|---|---|---|---|---|
| JP | 08281074 A | * | 10/1996 | | B01D 53/94 |
| JP | 10141147 A | * | 5/1998 | | F02M 25/07 |
| JP | 2010265854 A | * | 11/2010 | | |

*Primary Examiner* — Hai Huynh
*Assistant Examiner* — Raza Najmuddin
(74) *Attorney, Agent, or Firm* — Julia Voutyras; Alleman Hall McCoy Russell & Tuttle LLP

(57) ABSTRACT

Various systems and methods are described for operating an engine system having a sensor coupled to an exhaust gas recirculation system in a motor vehicle. One example method comprises during a first operating condition, directing at least some exhaust gas from an exhaust of the engine through the exhaust gas recirculation system and past the sensor to an intake of the engine and, during a second operating condition, directing at least some fresh air through the exhaust gas recirculation system and past the sensor.

18 Claims, 8 Drawing Sheets

(56) References Cited

U.S. PATENT DOCUMENTS

| | | | |
|---|---|---|---|
| 2005/0103013 A1* | 5/2005 | Brookshire et al. | 60/605.2 |
| 2007/0044472 A1* | 3/2007 | Zhang | 60/605.2 |
| 2007/0144503 A1* | 6/2007 | Lohmann | 123/568.15 |
| 2010/0107631 A1* | 5/2010 | Pearson | 60/605.2 |
| 2010/0313863 A1* | 12/2010 | Yoshikawa et al. | 123/704 |
| 2011/0054762 A1* | 3/2011 | Nakayama et al. | 701/108 |
| 2011/0067664 A1* | 3/2011 | Kuroki et al. | 123/1 A |
| 2011/0072800 A1* | 3/2011 | Bidner et al. | 60/286 |

* cited by examiner

US 8,707,935 B2

EXHAUST GAS RECIRCULATION SYSTEM WITH A $NO_x$ SENSOR

TECHNICAL FIELD

The present application relates generally to an engine having a $NO_x$ sensor coupled to an exhaust gas recirculation system.

BACKGROUND AND SUMMARY

When new, offset values of exhaust gas sensors, such as $NO_x$ sensors, may be determined in order to calibrate the sensor so that accurate measurements of exhaust gas constituents may be obtained. Over time, however, sensor parameters can drift resulting in measurement error. For example, an offset and/or slope, which are calibration parameters used to define a linear transformation from sensor output to a measured parameter, may drift during sensor operation. Thus, periodic updates of the sensor parameters, including sensor offset, during the lifetime of the sensor may be used, where gasses of known $NO_x$ and/or ammonia ($NH_3$) are passed over the sensor to enable the update.

One approach places the sensor in the engine exhaust. U.S. Pat. No. 6,311,480 details a process to zero out the offset of a $NO_x$ signal, either during deceleration fuel shut-off or during lean operation at low load. However, opportunities for passing gasses of known constituent concentrations may be limited. One such opportunity mentioned, for example, is during deceleration fuel shut-off (DFSO) when the exhaust gas is comprised substantially of ambient air. If the sensor is downstream of a $NO_x$ storage catalyst, however, there is a possibility that $NO_x$ may exit the catalyst in the exhaust stream. Further, the sensor may be cross sensitive to other gasses present in the exhaust stream, such as ammonia. As such, it may be difficult to determine an accurate $NO_x$ offset even during DFSO, which may lead to an increase in $NO_x$ emissions over time. Another opportunity for passing gasses of known constituent concentrations is, for example, during lean and low load engine operation. During such operation, however, there is a risk of break-through and exhaust gas constituent concentrations (such as $NO_x$ and $NH_3$) higher than assumed.

The inventors herein have recognized the above problems and have devised an approach to at least partially address them. Thus, a method of operating an engine system having a $NO_x$ sensor coupled to an exhaust gas recirculation system of an engine in a motor vehicle is disclosed. The method comprises, during a first operating condition, directing at least some exhaust gas from an exhaust of the engine through the exhaust gas recirculation system and past the $NO_x$ sensor to an intake of the engine and, during a second operating condition, directing at least some fresh air through the exhaust gas recirculation system and past the $NO_x$ sensor.

In this manner, during the first operating condition, the sensor can more accurately measure operation, such as $NO_x$ levels, as the sensor experiences only a portion of the total exhaust flow. Further, during the second condition, an accurate offset, such as a $NO_x$ offset of the sensor, may be generated, while the engine may continue to carry out combustion.

In one specific example, a low pressure-EGR system may be configured such that it has a bypass which includes an EGR purge valve, the bypass being coupled at one end to the EGR passage and at its other end to the intake manifold downstream of a compressor of a turbocharger coupled to the engine. During the second operating condition, when the boost pressure provided by the compressor is greater than a current exhaust pressure, the EGR purge valve may be positioned to allow fresh air from the intake manifold to enter the EGR passage. Due to the pressure difference, the air flow direction in the EGR passage may be reversed during the second operating condition and, as a result, an EGR cooler may be purged of buildup. In addition, an offset of the sensor may be generated as fresh air flows from the intake manifold, past the sensor, and into the exhaust manifold.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
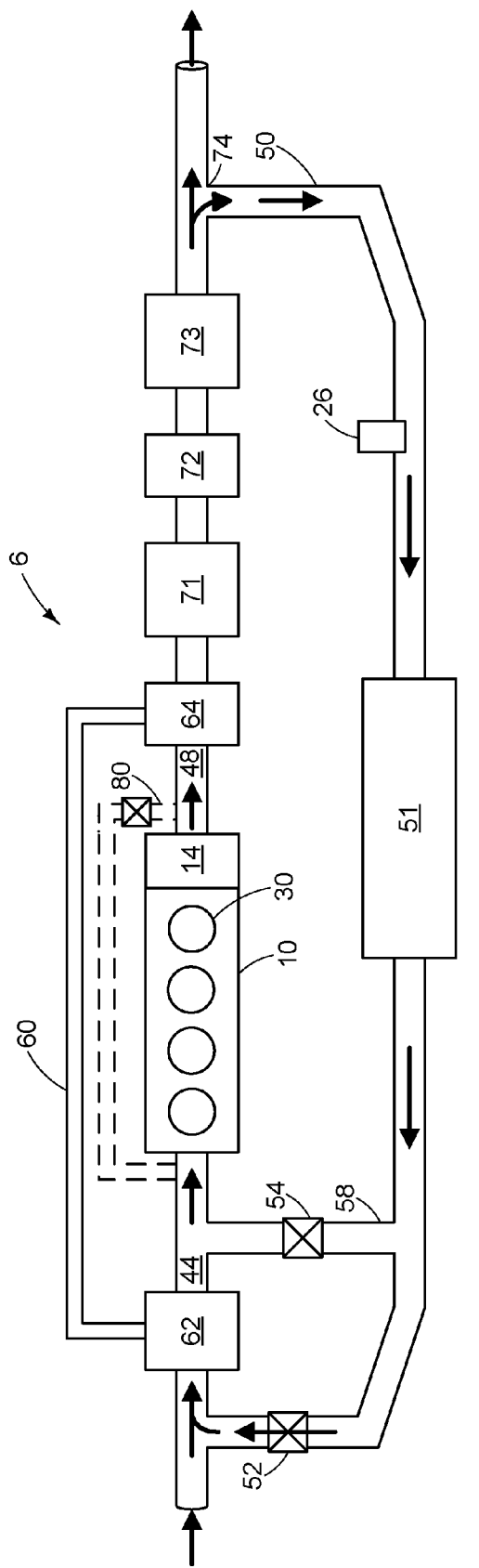
FIG. 1 shows a schematic diagram of an engine with an exhaust gas recirculation system including a valved bypass in a first operating condition.
Figure 1:
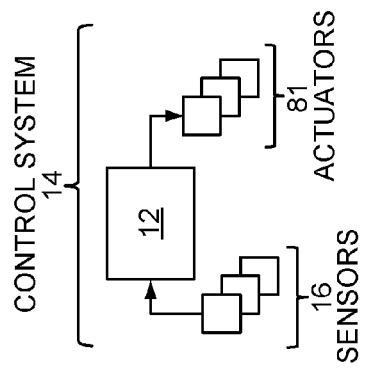

The following description relates to a method for operating an engine system with a sensor, such as a $NO_x$ sensor, coupled to an exhaust gas recirculation (EGR) system in a motor vehicle. The control system may be configured to control and/or direct air flowing through the EGR system and past the sensor, to identify characteristics, such as a calibration slope and/or offset of the sensor. During other operating conditions, the sensor measures parameters of the exhaust gas directed from the engine exhaust to the engine intake, and can correlate this measurement to conditions of the engine exhaust from the cylinders of the engine. In this way, engine operation may be controlled in response to the $NO_x$ sensor, while enabling in-service updates to the $NO_x$ sensor. Further, in some embodiments, the updating of the sensor is not dependent on specific operating conditions, and the sensor may be updated periodically throughout a drive cycle, even while combustion is carried out, as desired.

FIGS. 1-4 show schematic diagrams of a vehicle system 6. The vehicle system 6 includes an engine 10 which may be included in a propulsion system of an automobile, the engine 10 having a plurality of cylinders 30. Engine 10 may be controlled at least partially by a control system 14 including controller 12 and by input from a vehicle operator via an input device (not shown in FIGS. 1-4). The vehicle system 6 includes an exhaust passage 48 eventually leading to a tailpipe (not shown in FIG. 1-4) that eventually routes exhaust gas to the atmosphere. As described in more detail below, the exhaust passage 48 of vehicle system 6 may include one or more emission control devices.

The vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include an exhaust gas sensor 26 located in exhaust gas recirculation passage 50. In some embodiments, the exhaust gas sensor 26 may be $NO_x$ sensor for measuring an amount of $NO_x$ in the exhaust gas. In other embodiments, the exhaust gas sensor may be an oxygen sensor or an ammonia sensor, for example. Additionally, other sensors such as pressure, temperature, air-fuel ratio, and composition sensors may be coupled to various locations in the vehicle system 6. As another example, the actuators may include actuators for fuel injectors (not shown), control valves 52, 54, 80, and 56, and a throttle (not shown).

The control system 14 may include a controller 12. The controller 12 may be a microcomputer including the following, although not shown in FIGS. 1-4: a microprocessor unit, input/output ports, an electronic storage medium for executable programs and calibration values (e.g., a read only memory chip), random access memory, keep alive memory, and a data bus. Storage medium read-only memory may be programmed with computer readable data representing instructions executable by the microprocessor for performing the methods described below as well as other variants that are anticipated but not specifically listed. For example, the controller may receive communication (e.g., input data) from the various sensors, process the input data, and trigger the actuators in response to the processed input data based on instruction or code programmed therein corresponding to one or more routines. Example routines are described herein with reference to FIGS. 5-7.

Engine 10 may further include a compression device such as a turbocharger or supercharger including at least a compressor 62 arranged along intake manifold 44 (also referred to herein as "intake passage"). For a turbocharger, compressor 62 may be at least partially driven by a turbine 64 (e.g. via a shaft 60) arranged along exhaust passage 48. For a supercharger, compressor 62 may be at least partially driven by the engine and/or an electric machine, and may not include a turbine. Thus, the amount of compression provided to one or more cylinders of the engine via a turbocharger or supercharger may be varied by controller 12.

Engine 10 is shown coupled to exhaust passage 48 upstream of a plurality of emission control devices 71, 72, and 73. As an example, device 71 may be an apparatus for injecting and mixing urea with the exhaust gas. Further, device 72 may be a selective catalyst reduction (SCR) system which operates to reduce $NO_x$ emissions by storing the urea, which is a reductant, in a catalyst for reactions with $NO_x$. Device 73 may be a diesel particulate filter (DPF) which operates to remove soot from the exhaust gas. In some embodiments, during operating of engine 10, one or more of emission control devices 71, 72, and 73 may be periodically reset by operating at least one cylinder of the engine within a particular air/fuel ratio. These devices and their arrangement are an example of one possible design for emission control devices in an exhaust system for reducing $NO_x$ and using a $NO_x$ sensor. For example, in some embodiments, the order of emission control devices may be different (e.g., the DPF may be upstream of the SCR). Further, emission control devices 71, 72, and 73 may be another exhaust treatment system such as a lean $NO_x$ trap (LNT).

Further, in the disclosed embodiments, an exhaust gas recirculation (EGR) system may route a desired portion of exhaust gas from exhaust passage 48 through a "T" fitting 74 downstream of emission control devices 71, 72, and 73 to intake passage 44 via EGR passage 50, the exhaust gas entering intake passage 44 upstream of compressor 62. As such, the EGR system may be a low pressure-EGR (LP-EGR) system. The amount of EGR provided to intake passage 44 may be varied by controller 12 via an EGR valve (EGR valve 52 in FIGS. 1 and 2 and EGR valve 56 in FIGS. 3 and 4) responsive to engine operating conditions, such as engine speed, engine load, etc. Further, an EGR sensor (not shown in FIGS. 1-4) may be arranged within the EGR passage and may provide an indication of one or more pressure, temperature, and concentration of the exhaust gas. Under some conditions, the EGR system may be used to regulate the temperature of the air and fuel mixture within the intake manifold, and/or may be used to reduce $NO_x$ formation of combustion by reducing peak combustion temperatures, for example. Further still, the EGR passage may include an EGR cooler 51, which may lower the temperature of exhaust gas flowing through the EGR passage. The "T" fitting may be used to sample the exhaust gas at the point in the exhaust system where exhaust gas constituent concentrations are desired for engine control and/or on board diagnostics (OBD).

Figure 2:
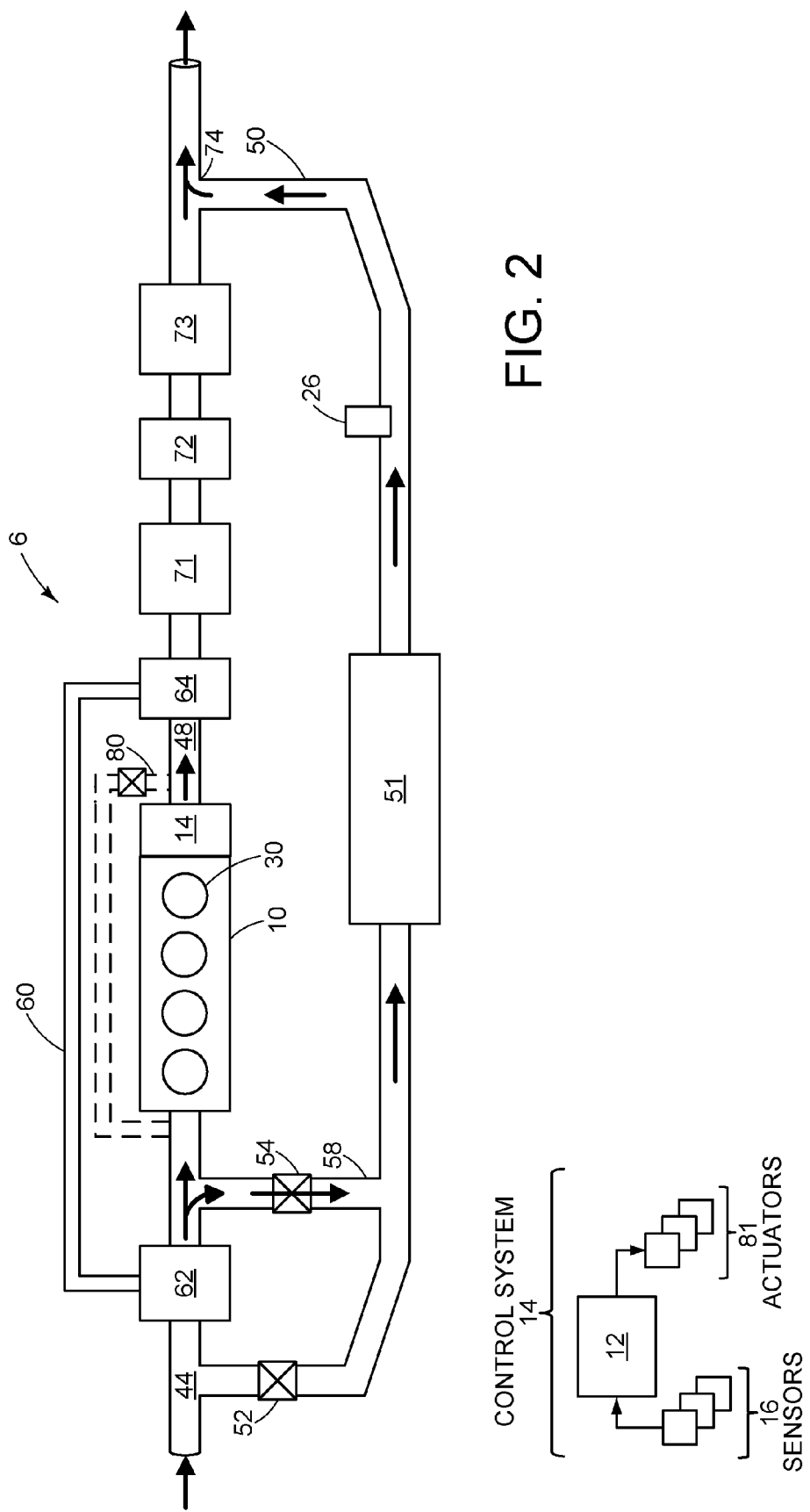
FIG. 2 shows a schematic diagram of the engine with the exhaust gas recirculation system of FIG. 1 in a second operating condition.

As illustrated in FIGS. 1 and 2, EGR passage 50 may further include a bypass 58, coupled at one end to EGR passage 50 and coupled at its opposite end to intake manifold 44 downstream of compressor 62. Bypass 58 may include an exhaust gas recirculation purge valve 54 which, under selected operating conditions, may be controlled to allow fresh air to flow from intake passage 44 into EGR passage 50, as will be described in greater detail below. Furthermore, EGR valve 52 and EGR purge valve 54 may be controlled to adjust an amount of flow in addition to the presence of flow.

The diagrams in FIGS. 1 and 2 illustrate two modes of operation of the EGR system with a bypass 58 coupled to the intake manifold 44. FIG. 1 demonstrates a first mode of operation, in which EGR is on (e.g., EGR valve 52 is at least partially open) and exhaust gas flows from the exhaust manifold downstream of the emission control devices, through the EGR passage 50, and into the intake manifold upstream of compressor 62. In such a configuration, with a $NO_x$ sensor 26 coupled to EGR passage 50, the engine may be controlled (e.g., EGR amount, air-fuel ratio, etc.) based on a generated measurement of $NO_x$ concentration in the exhaust, as will be described below. Here the $NO_x$ concentration in the exhaust can be inferred from the $NO_x$ concentration in the EGR passage 50, and based on the relative flow volumes/masses of the total flow through the exhaust to the flow through the EGR passage 50. Further, because sensor 26 is located in the EGR passage 50, exhaust emission levels may be determined by measuring only a portion of the exhaust flow, rather than all of the exhaust flow. As such, the exhaust gas sensor may have in effect a higher accuracy than if the sensor was located in the full exhaust flow.

FIG. 2 demonstrates a second mode of operation in which EGR valve 52 is closed (e.g., no EGR is desired) and EGR purge valve 54 is at least partially open. In such a configuration, based on boost and exhaust pressures, the air flow direction in EGR passage 50 may be reversed and boosted fresh air flows from intake manifold 44, through EGR passage 50, and into exhaust manifold 48. As such, an offset of a $NO_x$ or $NH_3$ sensor 26 may be generated and EGR cooler 51 may be purged of buildup. If the exhaust sensor 26 is a UEGO sensor, then a % $O_2$ gain may be generated.

Although a $NO_x$ sensor is used in the following embodiments, it will be understood that other exhaust gas sensors may be used. For example, a sensor for another exhaust gas constituent that has approximately zero percent concentration in ambient intake air, such as an ammonia sensor, may be used. Further, an oxygen sensor may be used and a percent oxygen reading gain factor may be generated instead of an offset factor.

Figure 8:
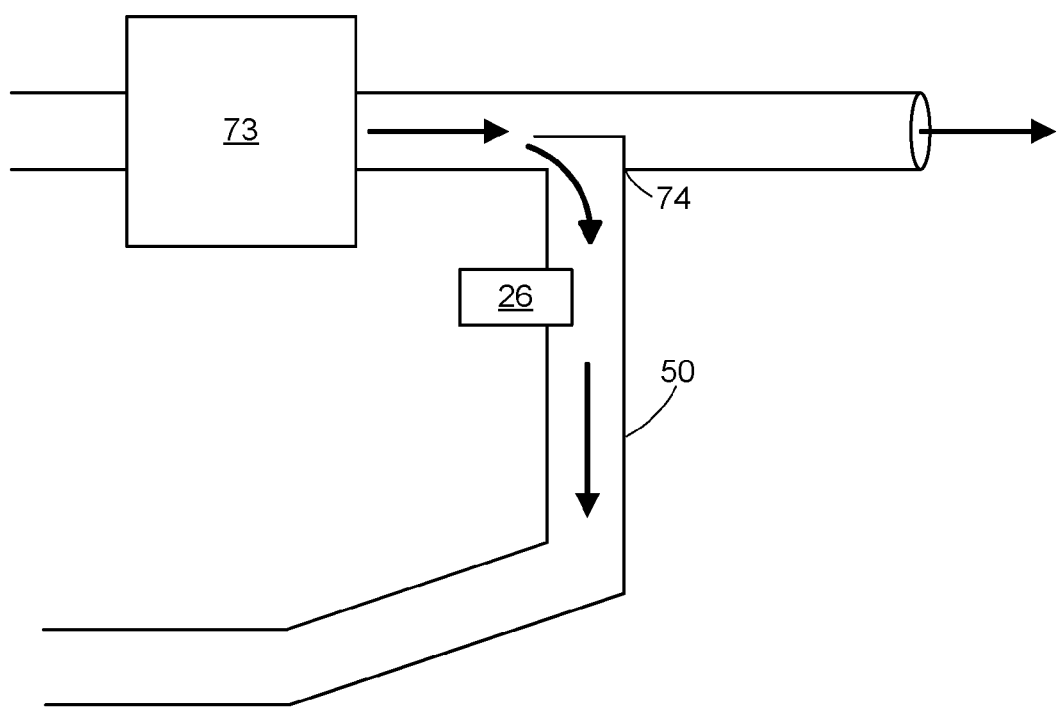
FIG. 8 shows a schematic diagram of a "T" fitting.

FIG. 8 shows a schematic diagram of "T" fitting 74 that may be used in the configurations of FIGS. 1 and 2. In such a configuration, it may be possible to measure exhaust gas constituents in the exhaust gas if both valves 52 and 54 are closed or if the flow through EGR valve 52 is low. For example, a ram effect from the exhaust flow from emission control device 73 may force eddy currents into the lower portion of "T" fitting 74 and down to sensor 26.

Figure 3:
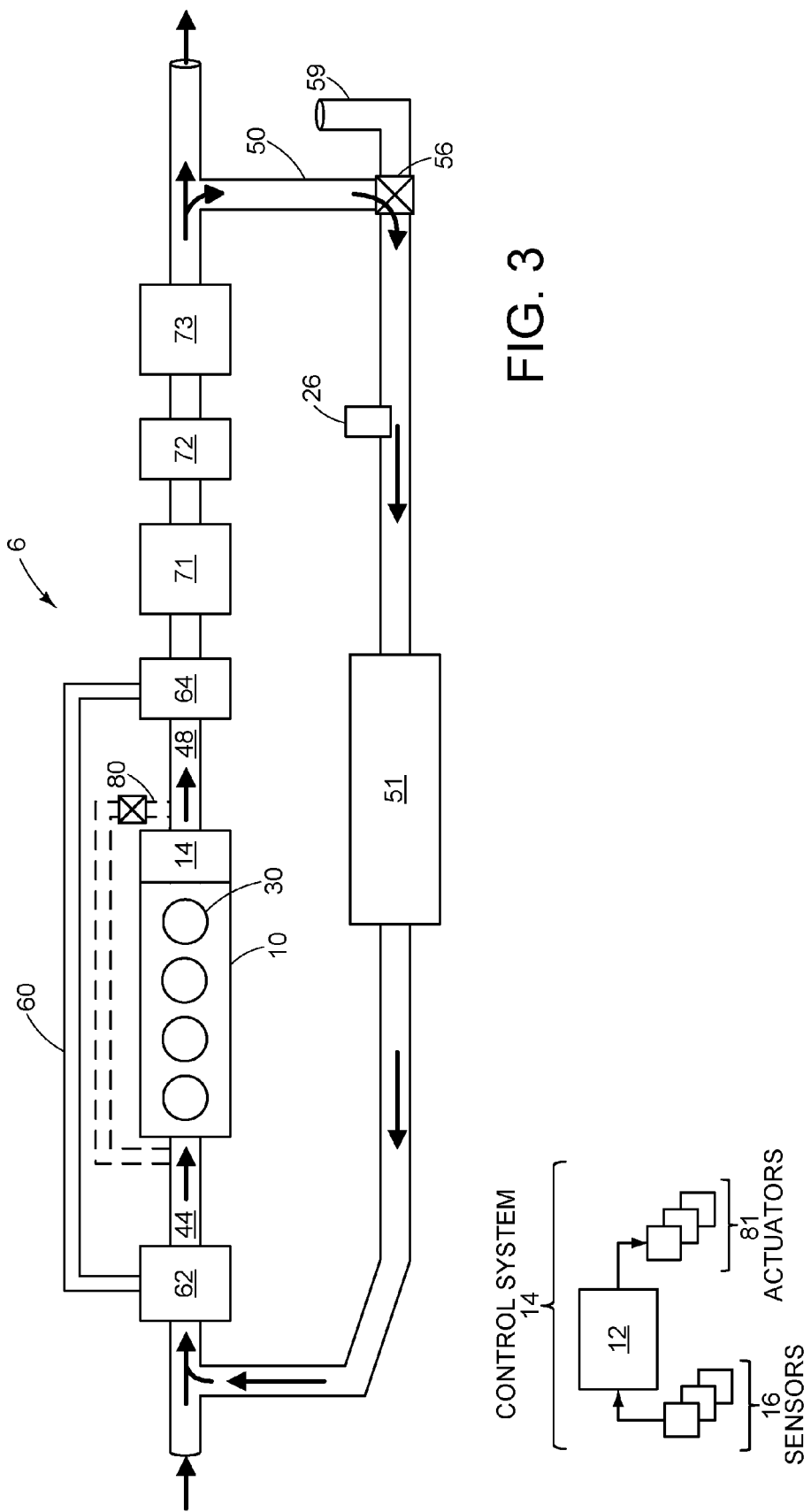
FIG. 3 shows a schematic diagram of an engine with an exhaust gas recirculation system including a bypass open to atmosphere in a first operating condition.
Figure 4:
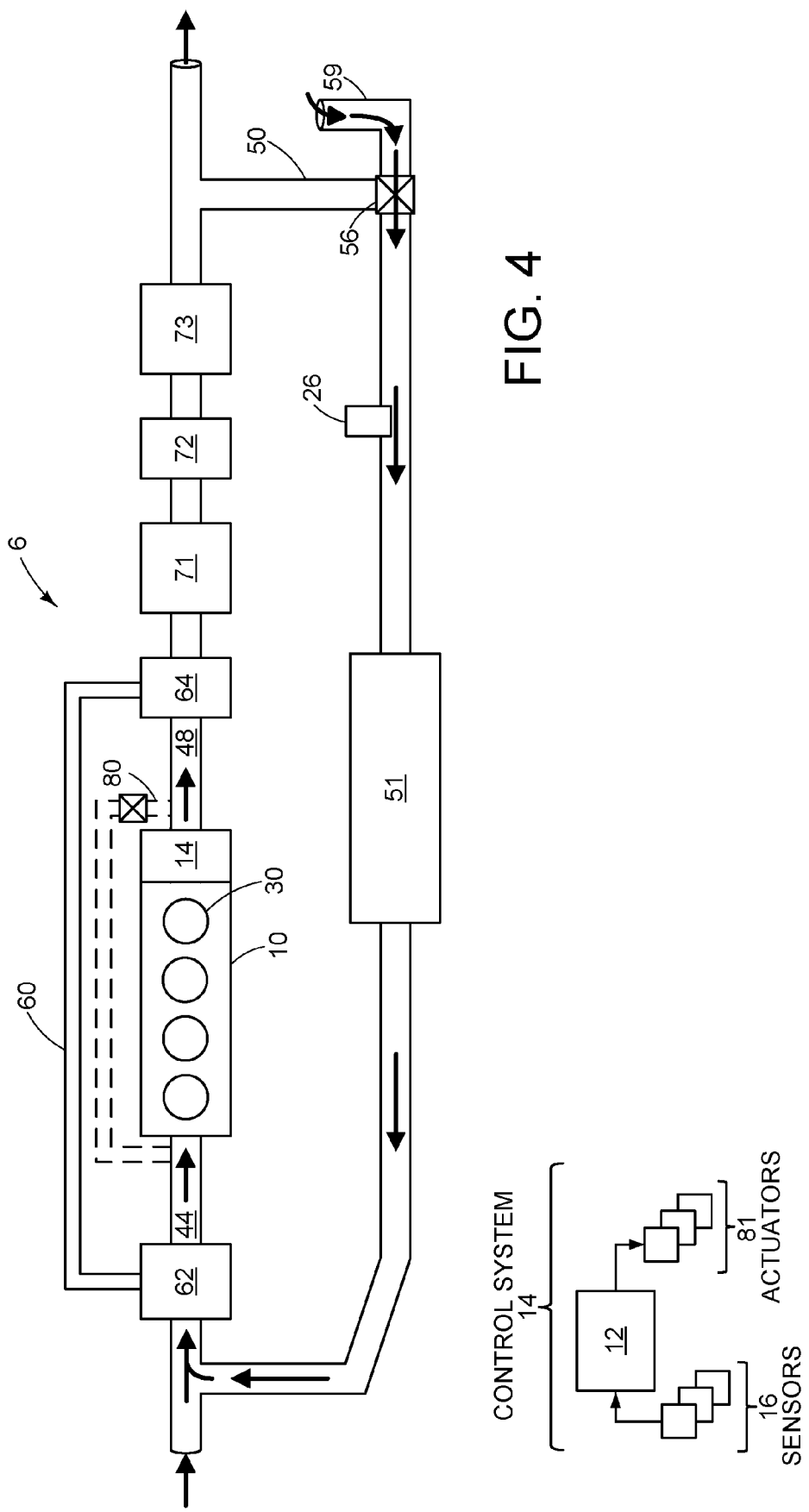
FIG. 4 shows a schematic diagram of the engine with the exhaust gas recirculation system of FIG. 3 in a second operating condition.

In another example embodiment, as shown in FIGS. 3 and 4, EGR passage 50 may further include a bypass 59, coupled at one end to EGR passage 50 and open to the atmosphere at its opposite end. An EGR valve 56 located at the junction between EGR passage 50 and bypass 59 may be controlled to operate in two positions such that, in a first position (FIG. 3), exhaust gas flows through EGR passage 50 and, in a second position (FIG. 4), fresh air from underbody flows through EGR passage 50, as will be described in greater detail below.

In some embodiments, the vehicle system 6 may additionally or alternatively include a second exhaust gas recirculation (EGR) system that may route a desired portion of exhaust gas from exhaust passage 48 downstream of emission control devices 71, 72, and 73 to intake passage 44 via EGR passage 80 (indicated by dashed lines in FIGS. 1-4), the exhaust gas entering intake passage 44 downstream of compressor 62 and downstream of the point where EGR bypass 58 (in FIGS. 1 and 2) is joined to intake manifold 44. As such, the EGR system may be a high pressure-EGR (HP-EGR) system. In the example embodiments described below, the EGR system referred to is an LP-EGR system.

The diagrams in FIGS. 3 and 4 illustrate two modes of operation of the EGR system with a bypass 59 open to the atmosphere at one end. FIG. 3 demonstrates a first mode of operation, in which EGR is on (e.g., EGR valve 56 is in a first position) and exhaust gas flows from the exhaust manifold downstream of the emission control devices, through the EGR passage 50, and into the intake manifold upstream of compressor 62. In such a configuration, with a $NO_x$ sensor 26 coupled to EGR passage 50, the engine may be controlled (e.g., EGR amount, air-fuel ratio, etc.) based on a generated measurement of $NO_x$ concentration in the exhaust, as will be described below. As described above, because sensor 26 is located in the EGR passage 50, exhaust emission levels may be determined by measuring a portion of the exhaust flow and, thus, sensor 26 may have a higher accuracy.

FIG. 4 demonstrates a second mode of operation in which EGR valve 56 is in a second position (e.g., no EGR is desired) in which ambient air from underbody flows into EGR passage 50, past sensor 26, and into intake manifold 44. In this manner, an offset of the sensor may be generated and, because the second mode of operation is not dependent on specific operating conditions, an offset may be generated several times throughout a drive cycle.

Figure 5:
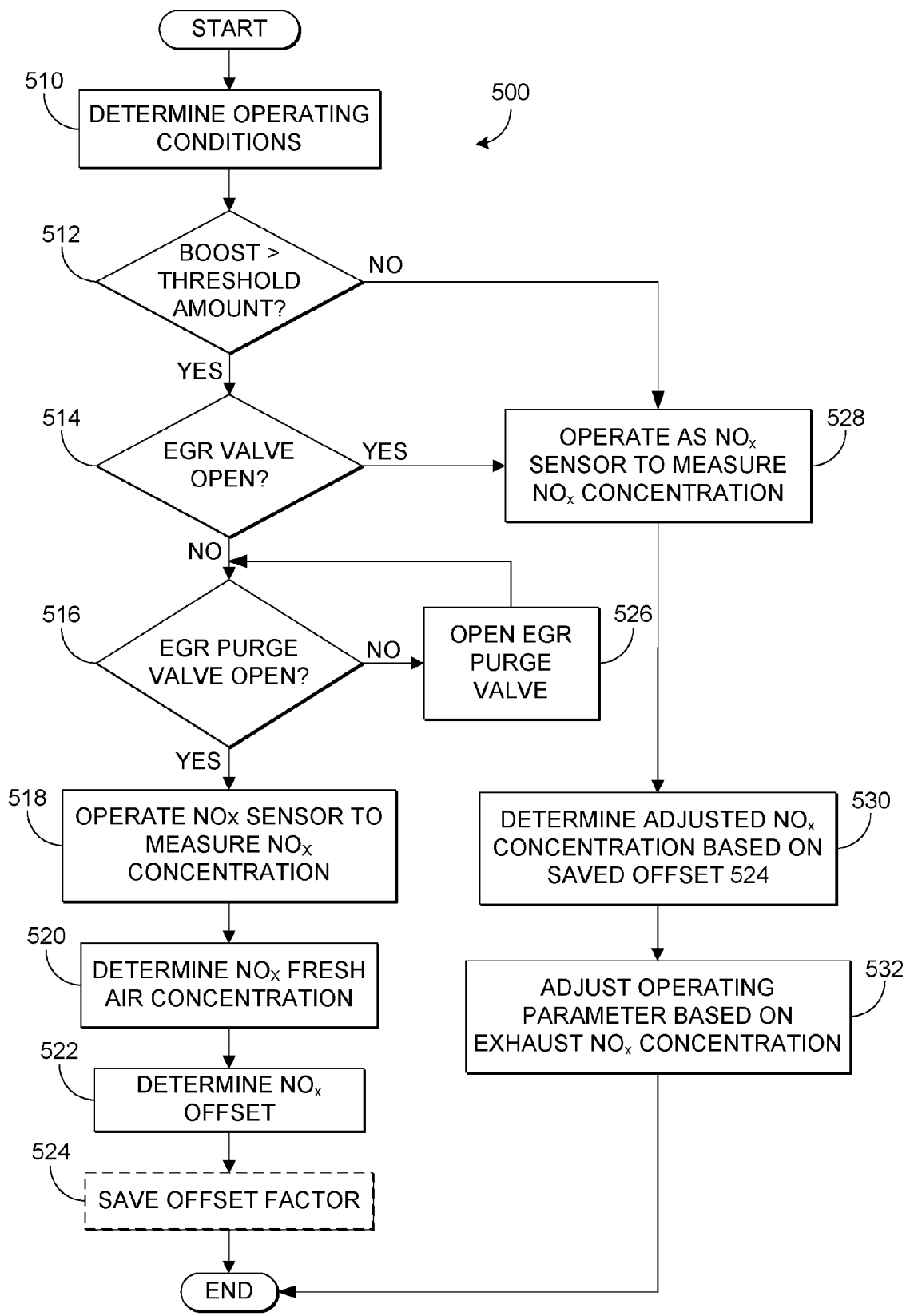
FIG. 5 shows a flow chart illustrating a routine for estimating $NO_x$ concentration.
Figure 6:
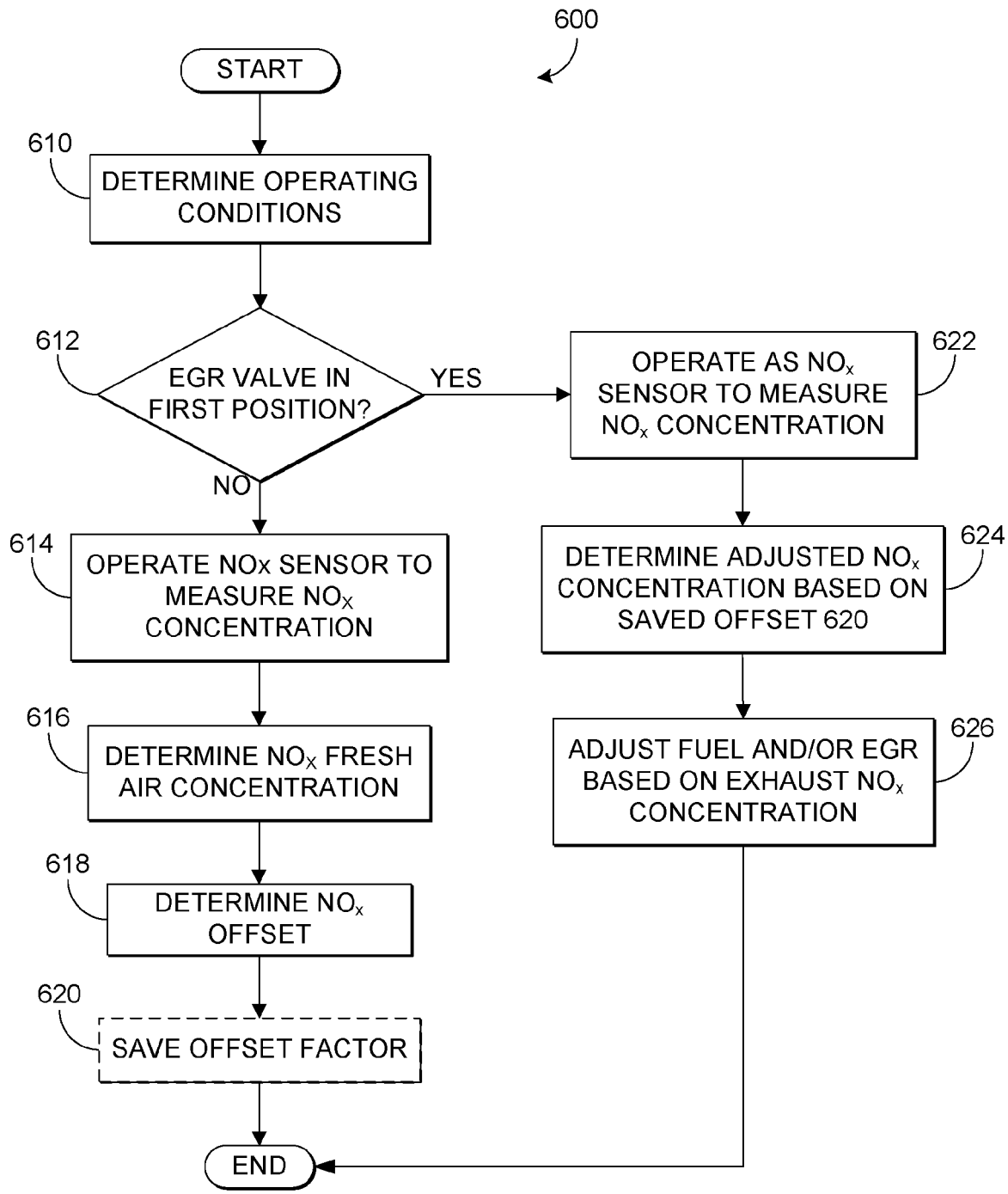
FIG. 6 shows a flow chart illustrating a routine for estimating $NO_x$ concentration.
Figure 7:
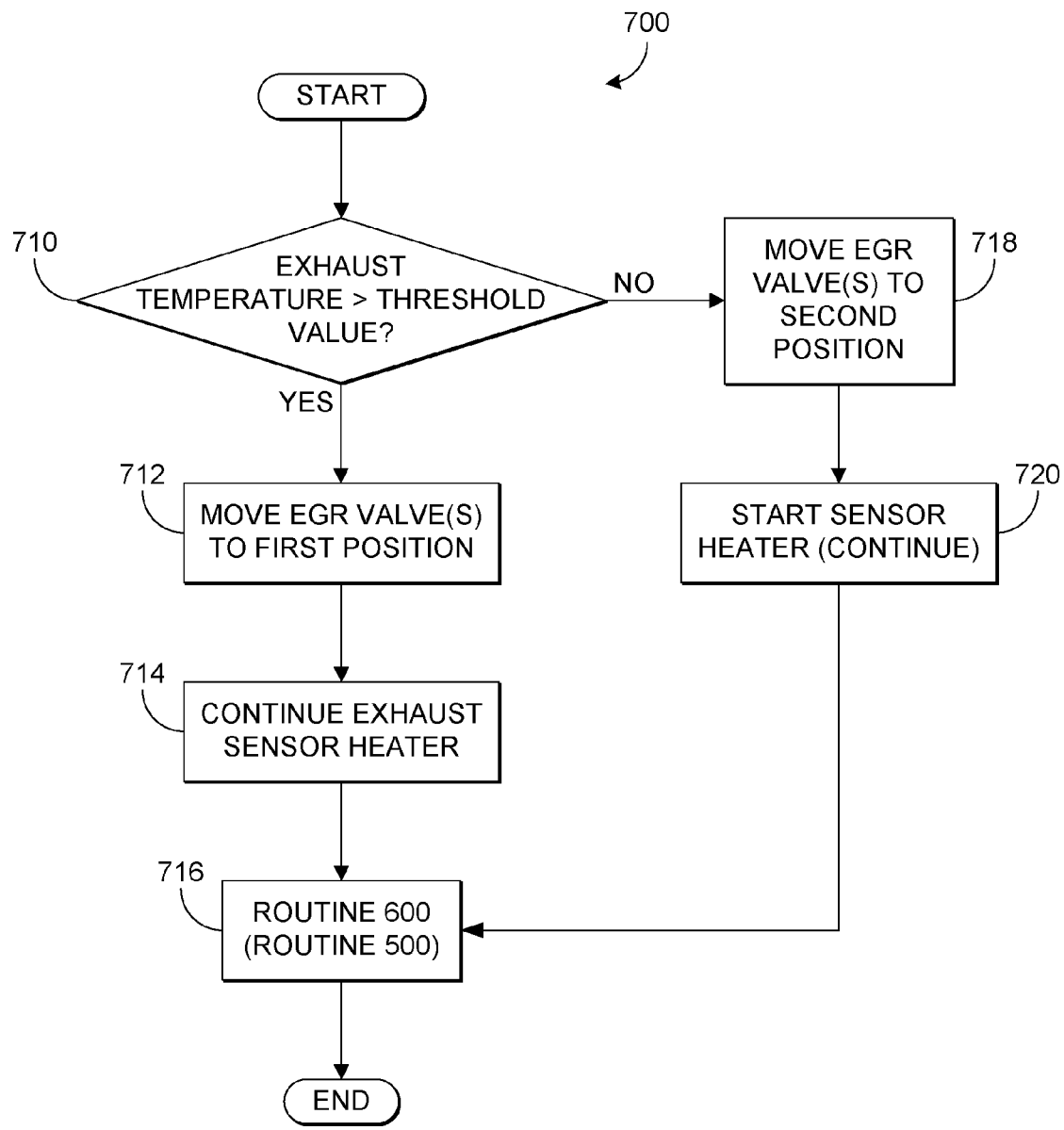
FIG. 7 shows a flow chart illustrating a control routine for an exhaust gas recirculation system during an engine start.

Example control and estimation routines for vehicle system 6 are shown in FIGS. 5-7. FIG. 5 illustrates an example routine for estimating a concentration of an exhaust gas constituent via the EGR system configuration shown in FIGS. 1 and 2, and FIGS. 6 and 7 illustrate example routines for the vehicle system configuration shown in FIGS. 3 and 4.

First, routine 500 in FIG. 5 shows an example method for measuring the concentration of $NO_x$ in the exhaust gas exiting the DPF in the configuration displayed in FIG. 1 and the concentration of $NO_x$ in the fresh air flowing through the EGR passage, as demonstrated by the configuration of FIG. 2. Specifically, routine 500 determines if the generated $NO_x$ concentration identifies an amount of $NO_x$ in the exhaust gases or if it is an offset of the $NO_x$ sensor based on the positions of the EGR and EGR purge valves. In one example, fresh air that is absent of exhaust emissions is selectively drawn into the exhaust gas recirculation system downstream of a compressor of a turbocharger of the engine, and the fresh air flows past the $NO_x$ sensor and into the exhaust. In this manner, an accurate $NO_x$ offset of the sensor may be periodically generated in order to maintain and/or reduce $NO_x$ emissions, even if the $NO_x$ sensor is positioned downstream of a catalyst.

At 510 of routine 500, engine operating conditions are determined. Engine operating conditions may include, but are not limited to, boost pressure, RPM, load, pressure in the exhaust manifold, temperature, and air-fuel ratio.

Once the operating conditions are determined, it is determined if boost pressure is greater than a threshold amount at 512 of routine 500. Under conditions in which the boost pressure is greater than the pressure in the exhaust manifold, the direction of flow in the exhaust gas recirculation passage may be reversed, allowing the passage to be purged of exhaust gas with fresh air from the intake manifold, as will be described below.

If it is determined that boost is not greater than a threshold amount at 512, routine 500 moves to 528 where the sensor is operated in a first mode of operation in which the $NO_x$ sensor is operated to measure a concentration of $NO_x$ in the exhaust gas. During the first mode of operation, the EGR valve is at least partially open and the EGR purge valve is closed. In this manner, exhaust gas flows from the exhaust manifold, through the exhaust gas recirculation passage, past the $NO_x$ sensor, and into the intake manifold upstream of the compressor.

On the other hand, if it is determined that boost is greater than a threshold amount at 512 of routine 500 in FIG. 5, routine 500 proceeds to 514 where it is determined if the EGR valve is open. If it is determined that the EGR valve is at least partially open and, therefore, exhaust gas is flowing through the EGR passage, routine 500 moves to 528 where the sensor is operated as a $NO_x$ sensor to determine a concentration of $NO_x$ in the exhaust gas, as described above. In contrast, if it is determined that the EGR valve is closed at 514 (e.g., EGR is off), routine 500 continues to 516 where it is determined if the EGR purge valve is open.

If it is determined that the EGR purge valve is closed, routine 500 moves to 526 where the EGR purge valve is opened. Once the EGR purge valve is opened, the routine returns to 516. When it is determined that the EGR purge valve is open, routine 500 of FIG. 5 proceeds to 518 where the sensor is operated in a second mode of operation to determine a concentration of NOx in fresh air flowing through the exhaust gas recirculation system. During the second mode of operation, the EGR valve is closed and the EGR purge valve is at least partially open. Because the boost pressure, and thus the pressure in the intake manifold where the bypass is coupled to the intake manifold, is greater than the pressure in the exhaust manifold, the flow in the EGR system may be reversed. As such, fresh air that is compressed by the compressor coupled to the intake manifold (e.g., boosted) flows through the exhaust gas recirculation passage, past the $NO_x$ sensor, and into the exhaust manifold downstream of the emission control devices. Additionally, because the direction of flow in the EGR passage is reversed and fresh air flows through the EGR passage instead of exhaust gas, the EGR cooler as well as the EGR passage may have contaminants dislodged.

Furthermore, in some embodiments, boost pressure may be controlled during the first or second mode of operation. For example, the EGR purge valve may be employed as a pressure limiting wastegate. If the boost pressure rises above a threshold level, the EGR purge valve may be opened to allow excess boosted air to flow into the EGR passage and exit the EGR passage downstream of the emission control devices or back into the intake upstream of the compressor.

Continuing with routine 500, at 520 the $NO_x$ fresh air concentration is determined. As the air stream flowing past the sensor is comprised of fresh air (e.g., ambient air) rather than exhaust gas, the $NO_x$ concentration determined at 520 is indicative of the amount of $NO_x$ in the fresh air (e.g., substantially zero). A generated $NO_x$ concentration that differs from the $NO_x$ concentration of fresh air, however, is indicative of an offset of the $NO_x$ sensor. Thus, the $NO_x$ concentration of the fresh air determined at 520 may then be utilized to determine a $NO_x$ offset at 522 of routine 500. A clock time may be included at 522 to ensure that a stable offset reading is obtained (e.g., to allow for line purge time and sensor response time). Further, because the direction of flow is reversed in the EGR passage and the sensor is not exposed to exhaust gases during the second mode of operation, the engine may continue to carry out combustion while the offset of the sensor is generated.

At 524 of routine 500 in FIG. 5, the offset factor of the $NO_x$ sensor may be adjusted based on the offset generated at 522. For example, the sensor may have an existing offset that may have been generated when the sensor was manufactured, during a previous drive cycle, or during a preceding determination of the sensor offset from the same drive cycle. If the offset generated at 522 is different from the existing offset factor of the sensor, then the $NO_x$ offset is adjusted to reflect the new offset factor at 524.

Referring back to 512 and 514 of routine 500, if it is determined that the boost pressure is less than a threshold amount or if the EGR valve is open, the $NO_x$ sensor is operated in the first mode of operation to measure the concentration of $NO_x$ in the exhaust gas flowing past the $NO_x$ sensor in the exhaust gas recirculation system. The $NO_x$ measurement at 528 may require a clock time to account for the time to flow exhaust gas in the EGR passage. Once the $NO_x$ concentration is generated, an adjusted $NO_x$ concentration may be determined at 530 of routine 500 based on the saved offset determined at 524 during the second mode of operation (or the existing offset, if the offset was not adjusted). For example, the offset of the sensor may be subtracted from the exhaust $NO_x$ concentration generated at 528 resulting in an accurate indication of the amount of $NO_x$ in the exhaust gas.

At 532 of routine 500 in FIG. 5, one or more engine, exhaust system, and/or OBD operating parameters are adjusted based on the adjusted concentration of $NO_x$ in the exhaust. As one example, a state of the catalyst may be controlled in response to the adjusted exhaust $NO_x$ concentration. For example, in at least one condition, an amount of urea injected into the exhaust may be increased in response to an increase in exhaust $NO_x$ concentration indicated by the adjusted $NO_x$ sensor signal. In this manner, the amount of $NO_x$ in the emissions may be decreased to a desired level. As another example, the $NO_x$ concentration determined at 532 may be used to by the controller for on board diagnostics (OBD) of the exhaust aftertreatment system. An amount of $NO_x$ that is too high or too low may indicate degradation of one or more components of the aftertreatment system.

As described above, the positions of the EGR and EGR purge valves determine the constituents of and the direction of the air stream flowing past the $NO_x$ sensor located in the exhaust gas recirculation passage. If the EGR valve is at least partially open and the EGR purge valve is closed, exhaust gas flows past the $NO_x$ sensor and the sensor operates in a first mode to determine an exhaust $NO_x$ concentration. Alternatively, if the EGR valve is closed and the EGR purge valve is at least partially open, fresh air flows in a direction opposite to that of the first mode and past the $NO_x$ sensor such that the sensor operates to generate a $NO_x$ offset. If both valves are partially open, then the flow direction and speed will depend on how far each valve is open. The $NO_x$ offset may then be utilized by the controller to adjust one or more operating parameters during a subsequent first mode of operation.

Similarly, in the EGR system configuration of FIGS. 3 and 4, the position of the EGR valve determines the constituents of the air stream flowing past the $NO_x$ sensor located in the exhaust gas recirculation passage. The flow chart in FIG. 6 depicts a routine 600 for estimating the concentration of $NO_x$ in the exhaust gas at the "T" fitting in the configuration displayed in FIG. 3 (first position). The concentration of $NO_x$ in the fresh air flowing through the EGR passage is demonstrated by the configuration of FIG. 4 for the second valve position. Specifically, routine 600 determines if the generated $NO_x$ concentration is indicative of an amount of $NO_x$ in the exhaust gases or if it identifies an offset of the $NO_x$ sensor based on the position of the EGR valve.

At 610 of routine 600 in FIG. 6, engine operating conditions are determined. Engine operating conditions may include, but are not limited to, air-fuel ratio and temperature.

Once the engine operating conditions are determined, routine 600 proceeds to 612 where it is determined if the EGR valve is in a first position. If it is determined that the valve is in the first position, routine 600 moves to 622 where the sensor is operated in a first mode of operation to measure a concentration of $NO_x$ in the exhaust gas. During the first mode of operation in which the EGR valve is in the first position, exhaust gas flows from the exhaust manifold, through the exhaust gas recirculation passage, past the $NO_x$ sensor, and into the intake manifold upstream of the compressor.

On the other hand, if it is determined at 612 that the EGR valve is not in the first position, rather, it is in a second position, routine 600 proceeds to 614 where the sensor is operated in a second mode to generate a concentration of $NO_x$ of the fresh air flowing through the exhaust gas recirculation system. During the second mode of operation in which the EGR valve is in the second position, fresh air flows into the bypass from the underbody of the vehicle, through the EGR passage, past the $NO_x$ sensor, and into the intake manifold. In this manner, air that is free from exhaust gases may flow past the $NO_x$ sensor and an offset of the $NO_x$ sensor may be generated. Further, because the sensor is not exposed to exhaust gases during the second mode of operation, the offset of the sensor may be generated while the engine continues to carry out combustion.

At 616 of routine 600 in FIG. 6, the concentration of $NO_x$ of the fresh air is determined. As described above with reference to FIG. 5, since the air stream flowing past the sensor is comprised of fresh air rather than exhaust gas, the $NO_x$ concentration determined at 616 is indicative of the amount of $NO_x$ in the fresh air (e.g., substantially zero). The $NO_x$ concentration of the fresh air determined at 616 may then be utilized to determine a $NO_x$ offset at 618 of routine 600. Further, the offset factor of the $NO_x$ sensor may be adjusted based on the offset generated at 620 of routine 600 if the offset generated at 618 differs from the prior saved offset factor. Moreover, because the second mode of operation is not dependent on specific operating conditions, such as boost pressure, the offset may be generated periodically throughout a drive cycle. For example, a $NO_x$ offset may be generated every ten miles during a drive cycle, during periods where $NO_x$ measurement is not needed, during cold start, etc.

Referring back to 612 of routine 600 of FIG. 6, if it is determined that the EGR valve is in the second position, routine 600 moves to 622 where the sensor is operated in the first mode and an exhaust $NO_x$ concentration is generated. After the exhaust $NO_x$ concentration is generated at 622, an adjusted $NO_x$ concentration signal is determined at 624 based on the saved offset generated at 620 of routine 600 during the second mode of operation (or the existing offset, if the offset was not adjusted).

At 626 of routine 600, one or more operating parameters may be adjusted based on the adjusted $NO_x$ concentration of the exhaust gas determined at 624. As described above with reference to FIG. 5, the adjusted $NO_x$ concentration may be utilized, for example, by the controller for on board diagnostics of the aftertreatment system and/or to control a state of the catalyst.

Thus, the constituents of the flow through the exhaust gas recirculation passage may be controlled depending on the position of the EGR valve of the EGR system configuration illustrated in FIGS. 3 and 4. As such, the $NO_x$ sensor coupled to the EGR passage may be utilized to generate an exhaust $NO_x$ concentration or an offset of the sensor which may be used to accurately determine the $NO_x$ concentration throughout the lifetime of the sensor. Additionally, the light-off time of the $NO_x$ sensor may be decreased during a cold engine start when the sensor is employed in the EGR system configuration shown in FIGS. 3 and 4, as will be described in detail with reference to FIG. 7.

Finally, the flow chart in FIG. 7 illustrates a control routine 700 for the configuration of the exhaust gas recirculation system shown in FIGS. 3 and 4. Specifically, routine 700 depicts a method for controlling the EGR valve and $NO_x$ sensor positioned in the EGR passage based on the temperature of the exhaust gas during a cold engine start. A similar routine may be applied to the exhaust gas recirculation configuration shown in FIGS. 1 and 2, and it is shown in parentheses in FIG. 7.

At the start (e.g., at key-on) of routine 700 at 710, it is determined if the exhaust temperature is above a threshold value. The threshold temperature may be adjusted higher or lower than 100° C. to be able to predict the presence of liquid water in the exhaust at the location of the $NO_x$ sensor for different engine, exhaust system, and vehicle conditions. In some embodiments, for example, the threshold value may be 100° C. (e.g., the dewpoint of $H_2O$). Below 100° C., water may be present in the exhaust gas which may cause degradation of the $NO_x$ sensor. As such, if it is determined that the exhaust temperature is below a threshold value, routine 700 moves to 718 where the EGR valve is moved to the second position in order to minimize the amount of exhaust gas entering the exhaust gas recirculation passage. Routine 700 then goes to a start of the sensor heater 720 and then to a routine 600 (or 500) at 716.

In some examples, key-on may occur under cold start conditions. As referred to herein, "cold start" implies the engine is started under conditions in which the engine has cooled to ambient conditions, which may be relatively hot or cold.

On the other hand, if it is determined that the exhaust temperature is above a threshold value, routine 700 continues to 712 where the EGR valve is moved to the first position and exhaust gas flows through the EGR passage. Once exhaust gas begins to flow through the EGR passage and past the $NO_x$ sensor, the $NO_x$ sensor continues the sensor heater power at 714 of routine 700. Because the temperature of the exhaust gas is above the dewpoint of water, the $NO_x$ sensor may be begin measuring the exhaust $NO_x$ concentration after the threshold value is reached at 710.

In this manner, by controlling the position of the EGR valve of the EGR system configuration shown in FIGS. 3 and 4, the light-off time of the $NO_x$ sensor may be decreased as the sensor may begin generating measurements of the $NO_x$ concentration in the exhaust gas as soon as the LP-EGR valve moves to the first position (e.g., once the exhaust gas exceeds a threshold temperature).

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A method of operating an engine system having a sensor coupled to an exhaust gas recirculation system (EGR), comprising:
   during a first operating condition, directing exhaust gas past the sensor to an engine intake; and
   during a second operating condition where an EGR valve is closed, opening an EGR bypass valve in response to the closed EGR valve and boost greater than a threshold boost amount, and directing fresh air past the sensor, wherein the sensor is a NOx sensor, where during the second operating condition the fresh air is directed through the EGR system, and where the NOx sensor is coupled to a passage in the EGR system at a location between a catalyst and an exhaust as recirculation cooler.

2. The method of claim 1, wherein during the second operating condition, fresh air is directed from an underbody of the vehicle, past the sensor, to the intake of the engine, and during the second operating condition, the engine carries out combustion and combusted exhaust gasses are directed to atmosphere and bypass the Nox sensor.

3. The method of claim 1, wherein during the second operating condition, fresh air is directed from an intake manifold, past the sensor, to the exhaust/ambient.

4. The method of claim 1, wherein during the second operating condition, the fresh air is boosted via a compressor.

5. The method of claim 1, wherein during the second operating condition, an offset of the NOx sensor is generated.

6. The method of claim 1, wherein during the first operating condition, the EGR system is operated as a low pressure EGR system.

7. The method of claim 1, wherein during the first operating condition, an output of the sensor corresponds to an exhaust NOx concentration of exhaust from an engine.

8. The method of claim 5, wherein a NOx sensor output is adjusted during the first operating condition based on the offset generated during the second operating condition, wherein one or more operating parameters are adjusted in response to the adjusted NOx sensor output.

9. The method of claim 8, wherein a state of a catalyst is controlled based on the adjusted NOx sensor output, wherein, in at least one condition, an amount of urea injected to the catalyst is increased in response to an increase in exhaust NOx concentration indicated by the adjusted NOx sensor output.

10. The method of claim 2, wherein during a cold start of the engine, the sensor is started, and the EGR system is operated in the second operating condition until the exhaust gas reaches a threshold temperature.

11. The method of claim 1, wherein the sensor is an exhaust gas constituent sensor and during the second operating condition, an offset or a gain of the exhaust gas constituent sensor is generated.

12. A method of operating an engine exhaust gas recirculation system (EGR) system coupled to an ammonia sensor, comprising:
during a first condition, directing exhaust gas past the ammonia sensor to an engine intake; and
during a second condition where an EGR valve is closed, generating a gain, opening an EGR bypass valve in response to the closed EGR valve and boost greater than a threshold amount, and directing fresh air past the ammonia sensor.

13. The method of claim 12, wherein during the second operating condition, an offset of the ammonia sensor is generated.

14. A system for an engine in a vehicle, the system comprising:
an exhaust gas recirculation system, the exhaust gas recirculation system having an exhaust gas recirculation passage coupled at a first end to an exhaust manifold of the engine downstream of one or more catalysts and a second end of the passage coupled to an intake manifold of the engine upstream of a compressor;
a bypass coupled at one end to the exhaust gas recirculation passage and coupled at an opposite end to the intake manifold downstream of the compressor;
an exhaust gas recirculation valve coupled to the exhaust gas recirculation passage between the second end of the passage and the bypass;
an exhaust gas recirculation purge valve coupled to the bypass between the exhaust gas recirculation passage and the intake manifold; and
a NOx sensor coupled to the exhaust gas recirculation passage between the first end of the exhaust gas recirculation passage and an exhaust gas recirculation cooler.

15. The system of claim 14, further comprising a control system comprising a computer readable storage medium, the medium including instructions thereon, the control system receiving communication from the NOx sensor, the medium comprising:
instructions for operating the exhaust gas recirculation valve and the exhaust gas recirculation purge valve in a first mode wherein the valve is at least partially open and the purge valve is closed and exhaust gas flows through the exhaust gas recirculation passage, past the NOx sensor, and into the intake manifold;
instructions for operating the exhaust gas recirculation valve and exhaust gas recirculation purge valve in a second mode wherein the valve is closed and the purge valve is at least partially open and fresh air flows through the exhaust gas recirculation passage, past the NOx sensor, and into the exhaust manifold;
instructions for identifying an exhaust NOx amount based on output from the NOx sensor during the first mode of operation;
instructions for identifying an ambient NOx amount based on output from the NOx sensor during the second mode of operation; and
instructions for adjusting a NOx signal during the first mode of operation based on the ambient NOx amount identified during the second mode of operation, the ambient NOx amount being an offset of the NOx sensor.

16. The system of claim 15, wherein the second mode of operation includes when boost pressure is greater than a threshold amount, the threshold amount greater than a current exhaust pressure, a flow direction being reversed in the exhaust gas recirculation passage during the second mode as compared to the first mode.

17. The system of claim 15, further comprising instructions for, during a subsequent first mode of operation, adjusting the exhaust NOx amount based on the NOx sensor offset.

18. The system of claim 15, wherein during the second mode of operation, the exhaust gas recirculation cooler is purged.

* * * * *